April 7, 1953

J. YOUHOUSE 2,633,696

CYCLOMETER CLOCK

Original Filed Nov. 22, 1944

2 SHEETS—SHEET 1

INVENTOR
Joseph Youhouse
BY [signature]
ATTORNEY

April 7, 1953 J. YOUHOUSE 2,633,696

CYCLOMETER CLOCK

Original Filed Nov. 22, 1944 2 SHEETS—SHEET 2

INVENTOR
Joseph Youhouse
BY [signature]
ATTORNEY

Patented Apr. 7, 1953 2,633,696

UNITED STATES PATENT OFFICE 2,633,696

CYCLOMETER CLOCK

Joseph Youhouse, Fairfield, Conn., assignor to Casco Products Corporation, Bridgeport, Conn., a corporation of Connecticut Original application November 22, 1944, Serial No. 564,608, now Patent No. 2,579,166, dated December 18, 1951. Divided and this application July 25, 1945, Serial No. 607,065

3 Claims. (Cl. 58—125)

This invention relates to clocks of the cyclometer or direct reading type.

This application is a division of application Serial Number 564,608, filed November 22, 1944, now Patent No. 2,579,166, granted December 18, 1951.

An object of the invention is to provide a cyclometer clock with a central sight opening, which may be made extremely thin, that is, of small dimension from front to rear, thereby permitting the time to be read from wide angles.

This is accomplished by the provision, in a clock, of indicia-carrying members all of which are in the form of disks, or annuli, some of which are mounted alongside and edgewise to each other to lie substantially in a single plane, others being nested within one another and within the edgewise-mounted disks, also to lie substantially in a single plane. By this arrangement quick and complete reading of the time, including hours, minutes, and seconds is possible, yet the front-to-rear dimensions of the clock may be made comparatively small while still retaining the balanced appearance afforded by a central sight opening for the numerals.

Another object of the invention is to provide a clock as above which is extremely simple, with comparatively few component parts, and is foolproof in construction and operation.

This is accomplished by a novel construction providing for simplified yet reliable intermittent drive means between the successive disks or elements carrying indicia. The disks carrying the tens-of-minutes and the hour numerals are mounted apart and lie substantially in a single plane, edgewise to each other with their adjacent edge portions juxtaposed. The hour disk is provided along its periphery with notches for engagement with integral projections on the periphery of the tens-of-minutes disk whereby the latter drives the hour disk intermittently.

In the embodiment of the invention illustrated herein, the tens-of-minutes disk has two projections diametrically opposite each other, and has two identical sets of equispaced numerals from 0 to 5 inclusive, the hour disk having but one set of equispaced numerals, from 1 to 12. Thus each half revolution of the tens-of-minutes disk advances the hour disk $\frac{1}{12}$ of a turn. The amount of turning which the tens-of-minutes disk does is therefore comparatively little, it being advanced $\frac{1}{12}$ of a revolution at a time, and by the provision of the said two sets of numerals on the tens-of-minutes disk, the "minute" disk, which has but one set of numerals from 0 to 9, may be smaller than the tens-of-minutes disk, and located so that its numerals are inside or enclosed by those of the latter.

By the provision of a simple pickup device, therefore, the $\frac{1}{10}$ revolution periodic advance of the "minute" disk may be utilized to periodically advance the tens-of-minutes disk $\frac{1}{12}$ revolution, by allowing for a slight amount of lost motion. The arrangement of the hour and minute numerals, and the intermittent movements of the disks are such that at the sight-opening of the clock casing the numerals appear upright and in a straight line at all times except when being momentarily shifted, so that the time may be easily read.

The "second" disk of the clock is of still smaller diameter than the "minute" disk, and is located on the same axis so that the "second" numerals are enclosed or encircled by those of the "minute" disk.

A simplified intermittent drive is provided between the "second" disk and the "minute" disk, which latter drives the tens-of-minutes disk, this drive comprising a single lug on the "second" disk, engaging once during each revolution spur gearing connected with the "minute" disk.

The tens-of-minutes disk is cupped so that the "minute" disk may be nested therein, and the "minute" disk also cupped to permit nesting of the "second" disk, thereby resulting in a compact assembly presenting a substantially flat surface at the front of the clock.

Other features and advantages will hereinafter appear.

Figure 2:
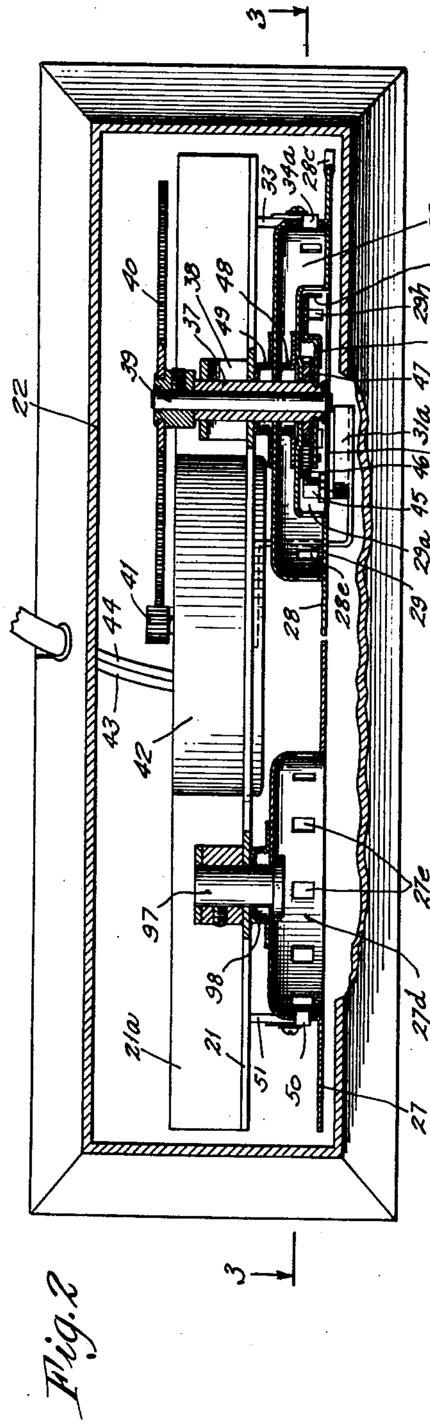
Fig. 2 is a horizontal section taken through the axes of the rotary indicia-carrying members.
Figure 1:
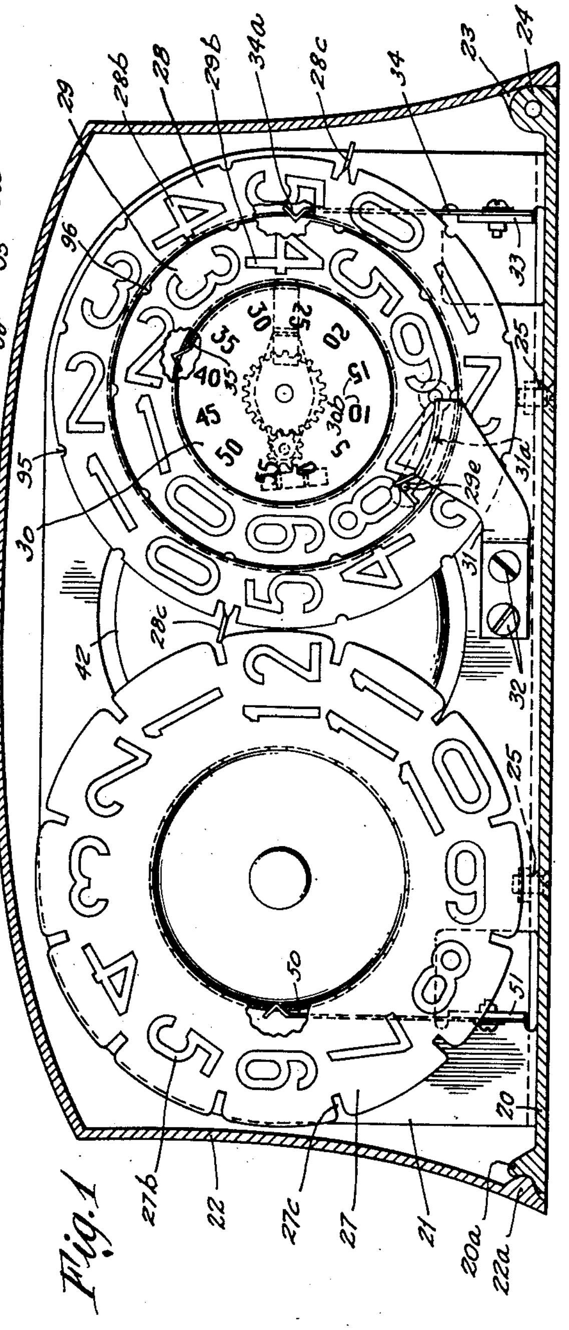
Figure 1 is a front elevation of the clock of this invention, with the front of the casing removed to show the mechanism.

Referring to Figs. 1 and 2, the improved clock of the present invention comprises a substantially rectangular elongate base 20 along the center of which is mounted a vertical support or frame 21 which carries essentially all of the time-indicating mechanism of the clock. An ornamental cover or housing 22 is provided for the clock mechanism, the housing being adapted to engage the edges of the base 20 and having at one end hinge means 23 cooperating with hinge means 24 on the base whereby the cover may be swung upwardly to expose and permit access to the timing mechanism.

Preferably the base 20 and cover 22 at their engaging ends opposite to the hinge means are provided with cooperating beads 20*a* and 22*a* respectively, which function as a detent to yieldably hold the cover 22 in closed position.

Referring to Fig. 2, the vertical frame 21 is in the form of a flat plate, having a flange 21*a* extending the length of its bottom edge, the flange being secured to the base 20 by screws 25 shown in Fig. 1.

Figure 4:
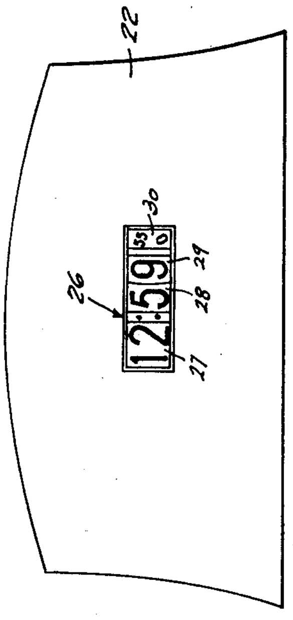
Fig. 4 is a front elevation or face view of the clock.

According to the present invention a novel mechanism is provided, mounted on the plate 21 within the casing 22, for indicating the time through a central sight opening 26 of the casing (Fig. 4) whereby the thickness, or front-to-back dimension of the clock may be made comparatively small. In connection with this, the frame 21 by virtue of its comprising but a single plate, and having novel bearing means, cooperates with the timing mechanism to accomplish this result.

As shown in Figs. 1 and 2, the time-indicating mechanism of the clock comprises a plurality of disks or disk-like rotary members so shaped and arranged that they occupy little depth, yet indicia carried by the members will line up at the sight opening 26 of the casing, to thereby indicate the time.

According to the present preferred embodiment of the invention an "hour" disk 27 is provided, rotatably mounted on the frame plate 21 substantially in front of the left half thereof, as viewed in Fig. 1. Cooperating with the "hour" disk 27 there is provided a tens-of-minutes disk 28 rotatably mounted to substantially cover the right half portion of the frame 21, the disks 27 and 28 being located edgewise with respect to each other and lying substantially in the same plane. For indicating minutes, a "minute" disk 29 is provided of smaller diameter than the disk 28, mounted in axial alignment with the latter and to lie in substantially the same plane therewith. A still smaller disk 30 having indicia representing seconds is also provided, mounted to rotate about the common axis of the disks 28 and 29, and lying substantially in the common plane of these latter disks.

According to this invention the tens-of-minutes disk 28 has a central cupped portion 28*a* to provide clearance for the "minute" disk 29, and the latter has a central cupped portion 29*a* to enable it to clear the "second" disk 30 so that the faces of these three disks may be flush with each other. The "hour" disk 27 is provided with numerals 27*b*, the tens-of-minutes disk 28 with numerals 28*b*, the "minute" disk 29 with numerals 29*b*, and the "second" disk 30 with numerals 30*b*, which cooperate with each other when viewed through the sight opening 26 to indicate the time.

Further, according to the present invention, the numerals 28*b* of the tens-of-minutes disk 28 are arranged in two separate identical sets, which cooperate with a single set of numerals 29*b* provided on the "minute" disk 29, whereby the movements of the disks are simply related, and the latter disk in its periodic movements may once in each revolution drive the tens-of-minutes disk through use of an extremely simple mechanism. This arrangement of numerals also enables a simple intermittent drive mechanism to be provided for driving the "hour" disk 27 periodically from the tens-of-minutes disk 28, as well as for driving the "minute" disk 29 from the "second" disk 30.

Considering the intermittent drive means between the tens-of-minutes disk 28 and the "hour" disk 27, the latter is provided with a plurality of slots 27*c* equispaced about the periphery thereof, the number of slots corresponding to the number of indicia on the disk, which in the present case is twelve. As shown in Fig. 1 the slots 27*c* are preferably located so that they alternate with the indicia 27*b*.

For cooperation with the slots 27*c* the tens-of-minutes disk 28 is provided with a pair of projections 28*c* located on the periphery of the disk diametrically opposite each other. The indicia 28*b* of the tens-of-minutes disk comprise two sets of numerals from "zero" to "five" inclusive, and the projections 28*c* are located respectively between the adjacent "zeros" and "fives" of the numerals. The projections and slots are so shaped that once in each half revolution of the tens-of-minutes disk 28 a projection 28*c* will enter a slot 27*c* and drive the "hour" disk 27 through one-twelfth of a revolution. This drive means between the disks 27 and 28 is extremely economical to produce, since all of the slots 27*c* may be formed in one blanking operation, and since the projections 28*c* may be formed at the time of blanking of the disk 28, and then with but a simple subsequent operation twisted as indicated to lie in a plane at right angles to the disk.

When the tens-of-minutes disk 28 is intermittently driven counterclockwise, each time through one-twelfth of a revolution, the indicia from "zero" to "five" will be sequentially presented repeatedly through the sight opening 26 of the clock. Each time the "five" leaves the sight opening and the "zero" appears therein, the "hour" disk 27 will be caused to rotate clockwise through one-twelfth of a revolution, thereby causing the indicia from "one" to "twelve" thereon to sequentially appear through the sight opening.

Inasmuch as the intermittent rotative movements of the "minute" disk 29 are each through one-tenth of a revolution, which represents a greater arc than the one-twelfth-revolution movements of the tens-of-minutes disk 28, the latter may be intermittently driven by the "minute" disk through a simple mechanism wherein a small amount of lost motion is involved.

Figure 3:
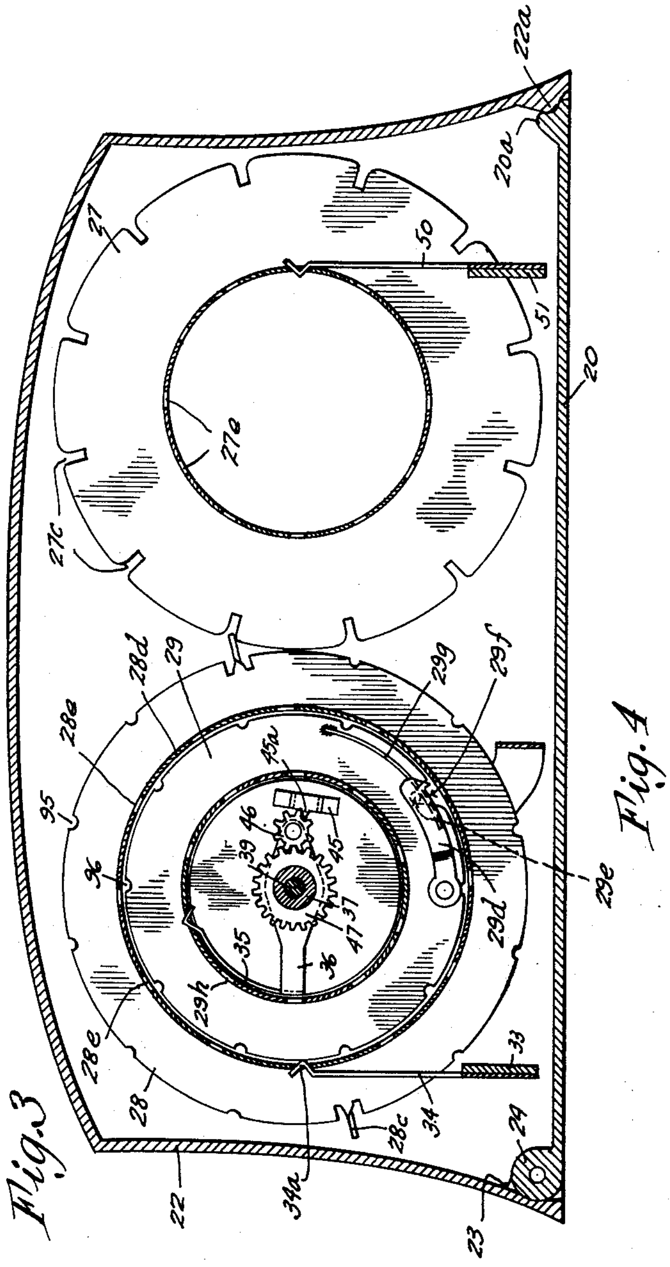
Fig. 3 is a vertical section taken on the line 3—3 of Fig. 2.

Accordingly, referring to Figs. 1 and 3, the disk 29 is provided with a pawl 29*d* pivotally mounted adjacent its periphery, and the side wall 28*d* of the cupped portion 28*a* of the tens-of-minutes disk is provided with a plurality of apertures 28*e* for engagement by the pawl 29*d*. The apertures 28*e* are ten in number, one for each of the numerals 28*b*.

Control of the pawl 29*d* is accomplished by means of a pin 29*e* rigidly carried by the pawl end, extending through a slot 29*f* in the periphery of the disk 29.

A leaf spring 29*g* is secured to the inner surface of the disk 29, as by welding or other suitable means, so that it may engage the pin 29*e* and yieldably hold the pawl 29*d* in the retracted position shown in Fig. 3.

For cooperation with the pin 29*e* at the front face of the dial 29, a bracket 31 is provided, mounted on the front surface of the frame plate 21 by screws 32 and having a camming flange 31*a* (Figs. 1 and 2) adapted to engage the pin 29*e* once during each revolution of the "minute" disk 29. Considering Fig. 1, the location of the flange 31*a* is such that when the numeral "nine" of the "minute" disk, during counterclockwise movements of the latter, begins to leave the sight opening 26, the pawl 29*d* will be swung outwardly by the flange and enter one of the apertures 28e of the tens-of-minutes disk 28. As the counterclockwise movement of the "minute" disk 29 continues, the pawl 29d will cause the tens-of-minutes disk 28 to be carried with it. When the numeral "nine" has completely left the sight opening 26 and the succeeding character "zero" fully entered the opening, the numeral "five" of the disk 28 will have left the sight opening and the succeeding character "zero" fully entered the opening. As this occurs, the pin 29e will leave and be disengaged from the flange 31a, whereupon the spring 29g will return the pawl to its normally retracted position. Thus, once during each revolution of the "minute" disk 29 the tens-of-minutes disk 28 will be advanced one-twelfth of a revolution.

A slight amount of lost motion is involved in the drive between the disks 29 and 28, this lost motion being mainly the result of the movement of the disk 29 required to advance the pawl 29e into engagement with the disk 28. Since the intermittent movement of the disk 29 is through one-tenth of a revolution, whereas the movement of the disk 28 is through one-twelfth of a revolution, the lost motion is accounted for by the difference in magnitude of these two movements.

Simplified means are provided by the invention for yieldably holding the disks 28 and 29 in their various intermittently-placed positions. Considering the tens-of-minutes disk 28, an arm 33 (Fig. 1) is lanced from the vertical frame plate 21 to extend forwardly thereof, this arm carrying a flat spring 34 the end 34a of which is made V-shaped to extend into the apertures 28e of the disk 28. The disk is thereby correctly positioned each time it is advanced one-twelfth of a revolution, it being yieldably held in its various rotative positions against accidental dislodgement and yet being movable when sufficient pressure is exerted by the pawl 29d, overcoming the restraint of the spring 34.

With regard to the detent for the disk 29, the cupped portion 29a thereof is apertured at ten equispaced points 29h as shown in Fig. 3, and a resilient detent spring 35 is provided, mounted on a frame 36 (Figs. 2 and 3) secured to the end of a stationary sleeve 37 fixedly carried by the frame 21. To securely hold the sleeve 37 in proper aligning position perpendicular to the plate 21 the latter is provided with a bracket 38 attached to its rear face, and encompassing the sleeve. The bracket 38, sleeve 37, and plate 21 may be secured together in any suitable manner as by welding.

A simplified drive is provided, according to the invention, between the "minute" disk 29 and the "second" disk 30. This latter disk is driven to turn continuously, and as shown in Fig. 2, is mounted on the end of a spindle 39 journaled in the sleeve 37, the other end of the spindle 39 carrying a gear wheel 40 engaged by a pinion 41 on the shaft of a synchronous drive motor 42 which may be of any suitable type having the proper speed and power, the motor being mounted on the frame plate 21 and energized through wires 43 and 44 as shown.

Referring to Figs. 1, 2 and 3, the rear face of the "second" disk 30 is provided with a bracket 45 having a laterally-extending lug 45a for periodic engagement with an idler pinion 46 mounted on the stationary frame 36 and meshing with a gear wheel 47 secured to the central cupped portion 29a of the disk 29. As seen in Fig. 2, the disk 29 and gear wheel 47 are centrally apertured so that they may be rotatably carried by the stationary sleeve 37. To provide a longer bearing surface for the disk 29, a cupped bearing plate 48 rotatably carried on the sleeve 37 is secured to the rear surface of the disk 29, thereby serving to steady the latter.

By this arrangement each revolution of the "second" disk 30 causes the lug 45a at the rear thereof to engage and drive through part of a revolution, the pinion 46 and therefore the gear 47 and disk 29 attached thereto. The amount of this movement is just sufficient to advance the "minute" disk 29 through one-tenth of a revolution, thereby substituting in the sight opening 26 the succeeding numeral carried by the disk.

The tens-of-minutes disk 28 is likewise centrally apertured and rotatably carried by the sleeve 37, its bearing surface being augmented by a cupped bearing plate 49 secured to the rear surface of the disk.

Referring to Fig. 1, the numerals 30b of the "second" disk 30 progress in steps of five. That is, twelve numerals are provided, starting with "0" and ending with "55," equispaced along the periphery of the disk and progressing counterclockwise, the direction of turning of the disk being clockwise.

A detent is also provided for the "hour" disk 27, the latter having a cupped central portion 27d (Fig. 2) with apertures 27e for engagement by a leaf spring 50 (Fig. 1) mounted on an arm 51 lanced from the frame 21.

The invention therefore provides by the above construction a simple time-indicating mechanism which may be mounted in a casing having comparatively small front-to-rear dimensions, the mechanism presenting through a central sight opening in the front of the casing, numerical indicia for indicating the time.

In operation, the "second" disk 30 is driven to turn clockwise continuously by the synchronous motor 42. The indicia 30b of the "second" disk become visible sequentially through the sight opening 26 of the casing. When the "55" numeral of the disk 30 leaves the sight opening 26 and the succeeding "0" numeral enters the sight opening, the drive mechanism between the disks 30 and 29 becomes operative so that the latter disk is rotated one-tenth of a revolution counterclockwise, thereby advancing the next "minute" digit for viewing through the sight opening. Also, each time the "minute" digit "9" leaves the sight opening 26 and the succeeding numeral "0" occupies the opening, the tens-of-minutes disk 28 will be advanced counterclockwise one-twelfth of a revolution, thereby presenting the next numeral of this latter disk in the sight opening. Each time a numeral "5" of the disk 28 leaves the sight opening 26 and the succeeding numeral "0" enters, the "hour" disk 27 will be advanced one-twelfth of a revolution, bringing into view the next succeeding "hour" numeral.

Thus, the time may be read from the disks 27, 28 and 29 accurately to within one minute, and by reading the "seconds" numerals on the disk 30, accurately to within five seconds.

To provide for convenient setting of the disks of the clock to the correct time when this is necessary, the peripheries of the disks 28 and 29 are provided with a plurality of equispaced notches 95 and 96 respectively into which a pointed implement may be inserted, for turning the disks without marring the faces thereof.

The "hour" disk 27 may be rotatably mounted in any suitable manner on the plate 21, as for instance by providing the plate with a rigidly secured stud 97, and by providing the disk 27 with a hub 98, the latter and disk being loose on the stud.

Variations and modifications may be made within the scope of this invention and portions of the improvements may be used without others.

I claim:

1. In a clock of the cyclometer type, a pair of disks rotatably mounted substantially edgewise to each other and having on corresponding faces each a plurality of time indicia located adjacent to, and equispaced along their respective peripheries, one of said disks having a plurality of equispaced notches in its periphery, one for each indicia and the other disk having an integral substantially radially projecting flat finger on its periphery, said finger having a twist at its base so that its surface is substantially perpendicular to the surface of the disk, and being adapted to cooperate with the said notches whereby once during each revolution of the disk and finger, the latter engages broadside the edge of a notch and drives the notched disk through only part of a revolution.

2. In a clock of the cyclometer type, a casing; a frame mounted in the casing, comprising a substantially flat vertical plate having a pair of spaced apertures therein; a bearing means carried by the plate, at said apertures; spindles carried by the bearing means, extending through the apertures in the plate; a disk carried by one of the spindles and a second disk and an annulus surrounding the same carried by the other spindle, said disks and annulus being parallel to the plate and located in substantially edgewise relation; means, including a motor carried by the plate on its other side and connected to the spindle driving the second disk for intermittently driving, according to a predetermined timing, the first disk; means extending from the second disk to the annulus for driving the annulus a part of a revolution for each revolution of the disk; periodically operable drive means extending between the periphery of the annulus and the first disk mounted on the other spindle and engageable during solely a part of each revolution of the annulus to drive the first disk, the latter being driven through only a part of a revolution; and indicia on the outer faces of the disks and annulus for indicating time.

3. In a clock of the cyclometer type, an hour disk and a flat tens-of-minutes annulus, each rotatably mounted and positioned substantially edgewise to each other and having on their peripheries intermittently engaging drive means engageable during solely a part of each revolution of the tens-of-minutes annulus to drive the hour disk through only part of a revolution; a flat minutes annulus rotatably mounted substantially edgewise to and coaxially within the tens-of-minutes annulus; intermittently operable drive means interconnecting the minutes annulus and tens-of-minutes annulus and engageable during solely a part of each revolution of the latter to drive the tens-of-minutes annulus through only part of a revolution; a seconds disk rotatably mounted substantially edgewise to and coaxially within the minutes annulus; means for continuously rotating said seconds disk; intermittently operable drive means between the minutes annulus and seconds disk actuated incident to rotation of said seconds disk to drive said minutes annulus during solely a part of each revolution of the seconds disk through only part of a revolution; and time indicia on the corresponding faces of the disk and annuli, said drive comprising a lug on the disk, and spur gearing connected with the annulus, said lug engaging the gearing once during each revolution of the disk to drive the annulus thereby by increments.

JOSEPH YOUHOUSE.

REFERENCES CITED

The following references are of record in the file of this patent:

UNITED STATES PATENTS

| Number | Name | Date |
|---|---|---|
| 360,269 | Beach | Mar. 29, 1887 |
| 392,337 | Webb | Nov. 13, 1888 |
| 402,823 | Hammer | May 7, 1889 |
| 429,927 | Longacre | June 10, 1890 |
| 595,592 | Ault | Dec. 14, 1897 |
| 1,204,284 | Lawrence | Nov. 7, 1916 |
| 1,626,988 | Vinas | May 3, 1927 |
| 1,935,842 | Freel | Nov. 21, 1933 |
| 1,997,570 | Baldwin | Apr. 16, 1935 |
| 2,106,466 | Paul | Jan. 25, 1938 |
| 2,130,873 | Bourguin | Sept. 20, 1938 |
| 2,266,183 | Fergusson | Dec. 16, 1941 |
| 2,266,198 | Haydon | Dec. 16, 1941 |
| 2,287,679 | Greenawalt | June 23, 1942 |